United States Patent [19]

James

[11] Patent Number: 4,613,263
[45] Date of Patent: Sep. 23, 1986

[54] VEHICLE MOUNTED SHIPPING RACK

[75] Inventor: Charles E. James, St. Cloud, Fla.

[73] Assignee: FLM Building Products, Inc., Orlando, Fla.

[21] Appl. No.: 774,988

[22] Filed: Sep. 11, 1985

[51] Int. Cl.⁴ ............................................... B60P 7/10
[52] U.S. Cl. ..................................... 410/32; 410/129; 296/24 R
[58] Field of Search ................... 410/2, 31, 32, 33, 34, 410/35, 121, 129; 211/45; 296/3, 24 R; 206/321, 453, 456

[56] References Cited

U.S. PATENT DOCUMENTS 3,365,067  1/1968  Miller et al. ........................... 211/45
3,887,077  6/1975  Frey ......................................... 24/45
4,360,298 11/1982  Fischer et al. ......................... 410/32

FOREIGN PATENT DOCUMENTS 1167137 11/1958  France ................................. 211/45
 857489  6/1956  United Kingdom ................. 211/45

Primary Examiner—Robert B. Reeves
Assistant Examiner—Dennis C. Rodgers
Attorney, Agent, or Firm—Duckworth, Allen, Dyer

[57] ABSTRACT

Disclosed is a vehicle-mounted shipping rack for bendable objects (such as construction materials) which have a lengthwise dimension greater than a dimension of the vehicle. The shipping rack is mounted on a transport body of the vehicle, and includes a frame defining plural compartments across the body, each compartment having a dimension longer than a corresponding dimension of the transport body, but being curved so as to fit within the corresponding dimension of the body so that the bendable objects may be transported in the shipping rack by bending along the curved compartments.

16 Claims, 4 Drawing Figures

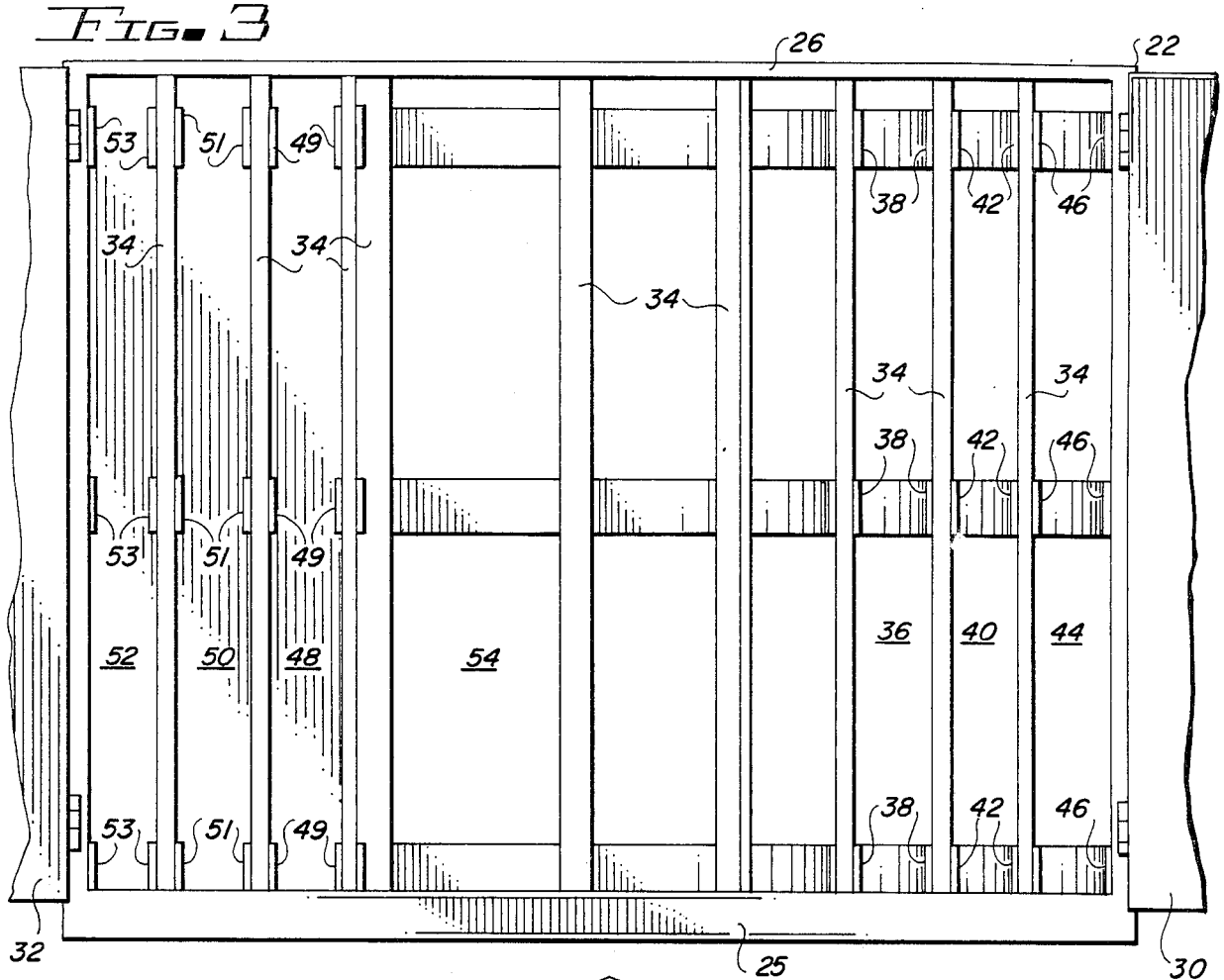
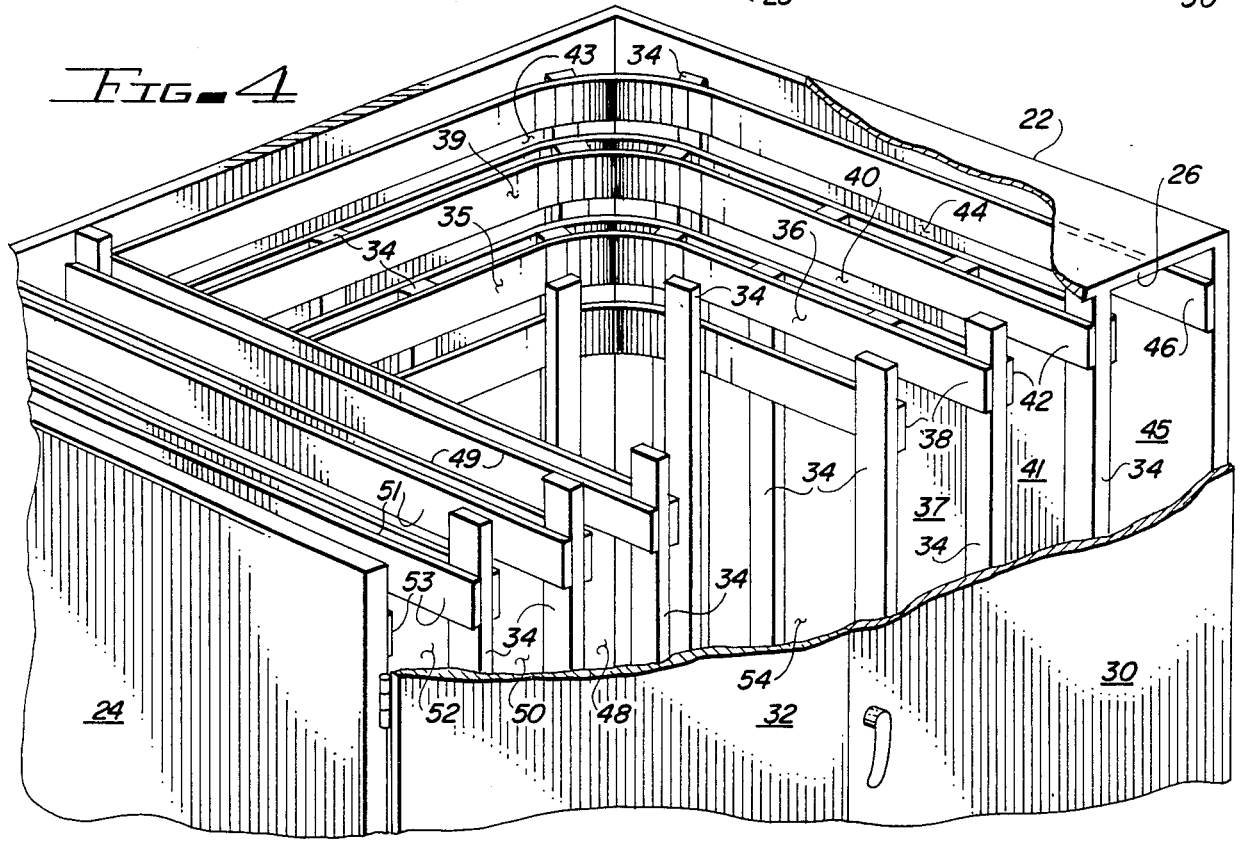

1

VEHICLE MOUNTED SHIPPING RACK

BACKGROUND OF THE INVENTION

1. Field of the Invention

The present invention relates generally to shipping and transporting vehicles, and in particular relates to such vehicles which are adapted to ship various types of construction materials.

2. Description of the Prior Art

In the construction industry, it is necessary to move large quantities of building materials from wholesale supply houses to construction sites, cabinet shops or the like. The transportation of such materials is done in a variety of trucks, vans and other shipping vehicles. However, since many construction sites, cabinet shops and similar facilities are located in residential and downtown areas, it is impractical to utilize certain vehicles having oversized truck beds. As a consequence, certain types of construction materials that are longer than the truck bed is wide must be shipped in a lengthwise position along the truck bed, resulting in wasted space and an inefficient movement of the goods. It is not uncommon to have to make several trips to the same location from one wholesale supply house, frequently with less than full loads on the transport vehicle.

Types of materials that must be handled with care in the shipment to cabinet shop and construction locations include high-pressure laminate plastic sheets. Such materials come in long lengths, often as long as 12 feet. However, such materials cannot be efficiently shipped on a truck of the type conventionally used for shipping such building materials, unless such materials are extended along the truck bed in the lengthwise direction. This results in the inefficiencies discussed above.

Of general interest with respect to the present invention are the following U.S. Pat. Nos.: 3,583,570 to Black; 4,304,336 to Mays; and 4,360,298 to Fischer et al. The Black patent discloses a carpet display rack formed with a radius with allows carpet to be bent about the rack. The Mays and Fischer et al. patents disclose racks for supporting materials on end, such as glass sheeting.

SUMMARY OF THE INVENTION

The present invention has as a principal object the provision of a shipping and/or storage rack permitting bendable materials having a dimension greater than a desired storage dimension to be bent about a radius in compartments formed in the shipping rack, to thereby permit the shipment of such bendable objects within a desired dimension.

The present invention further has as a principal object the provision for such a shipping rack in connection with a transporting vehicle which may facilitate the movement of the objects being shipped from one location to another.

In accordance with the present invention, a vehicle including a shipping rack for bendable objects having a lengthwise dimension greater than the dimension of the vehicle includes a vehicular prime mover and a wheel-supported transport body with the prime mover. A shipping rack is provided on the transport body, the shipping rack comprising frame means defining plural compartments across the transport body, each compartment having a dimension longer than a corresponding dimension of the transport body, but with each compartment being curved so as to fit within the corresponding dimension. Accordingly, bendable objects having a lengthwise dimension greater than the dimension of the transport body may be transported in the shipping rack by bending along the curved compartments.

In accordance with a preferred embodiment of the present invention, the transport body includes a support surface lying in a plane generally parallel with a surface across which the prime mover is to traverse, i.e. the ground. The curved compartments are defined by frame members extending generally normal to the support surface, together with curved railings extending between the frame members and generally parallel with the support surface. Each of the curved compartments includes a first, uncurved portion extending laterally across the support surface and generally normal to the direction of travel of the prime mover, and a curved portion extending generally parallel with the direction of travel.

Further, in accordance with a preferred embodiment of the present invention, the vehicle shipping rack combination further includes an enclosure about the shipping rack, together with a door permitting access to the curved compartments at one end thereof.

In the preferred embodiment, the frame members thus define plural, generally parallel compartments, each of which includes a first, uncurved portion extending from one end and a second, curved portion adjacent the second end. The railings are attached to the frame members and extend along the compartments continuously from the first, uncurved end to the second, curved end with the lengthwise dimension of each compartment between the first and second ends being greater than a dimension of the transport vehicle upon which the shipping rack is fitted, but with the rack fitting within that dimension of the transport vehicle by virtue of the curving of the second portion of each compartment in the shipping rack. To facilitate the insertion of the bendable objects (such as the construction material referred to above) into the compartments, the railings of each compartment are positioned inwardly of the adjacent ones of the ribs forming the frame members, wherein the bendable material may slide along the railings in each compartment and bend about the second, curved portion.

DESCRIPTION OF THE DRAWINGS

FIG. 3 is a side view illustrating the shipping rack of FIGS 1 and 2.

FIG. 4 is a perspective view, partially cut away, of the shipping rack of FIGS. 2 and 3.

DETAILED DESCRIPTION OF THE PREFERRED EMBODIMENT

A detailed description of the preferred embodiment of the present invention will now be described with reference to the drawings.

Figure 1:
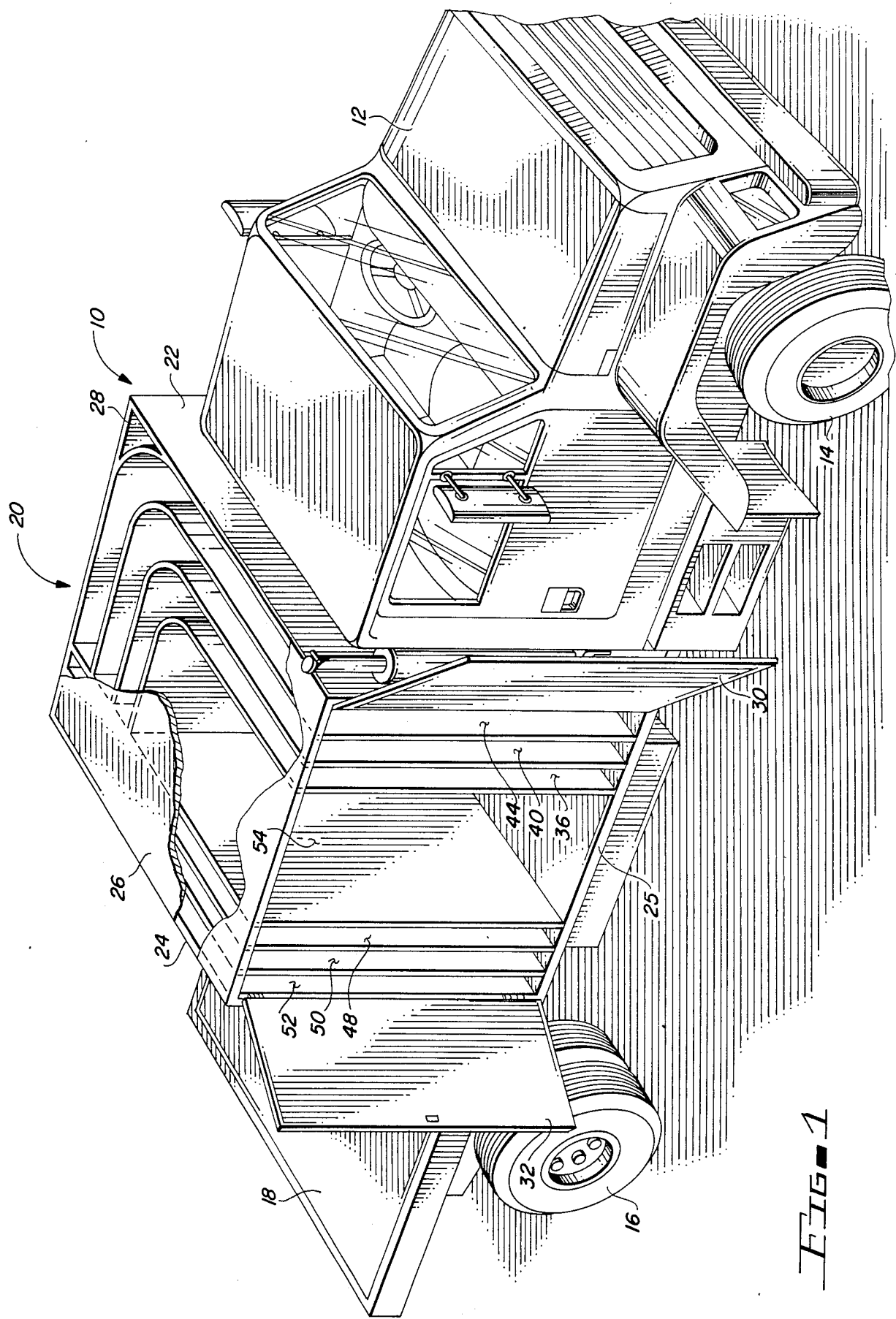
FIG. 1 is a perspective view of the vehicle and shipping rack arrangement of the present invention illustrating one side and the top of the shipping rack as mounted on the support surface of the transport body of the vehicle, and with a portion of the top cut away.

In FIG. 1, reference numeral 10 refers generally to the vehicle and shipping rack combination, which includes a vehicle cab 12 as prime mover, wheels 14 and 16 driven by the prime mover 12 and a transport body 18 having an upper support surface. Vehicles of this general type are typically used for the transporting of construction supplies from wholesale supply houses to construction sites, cabinet shops and other construction facilities. Such prime movers may include stake bodies or enclosed beds, for example.

Figure 2:
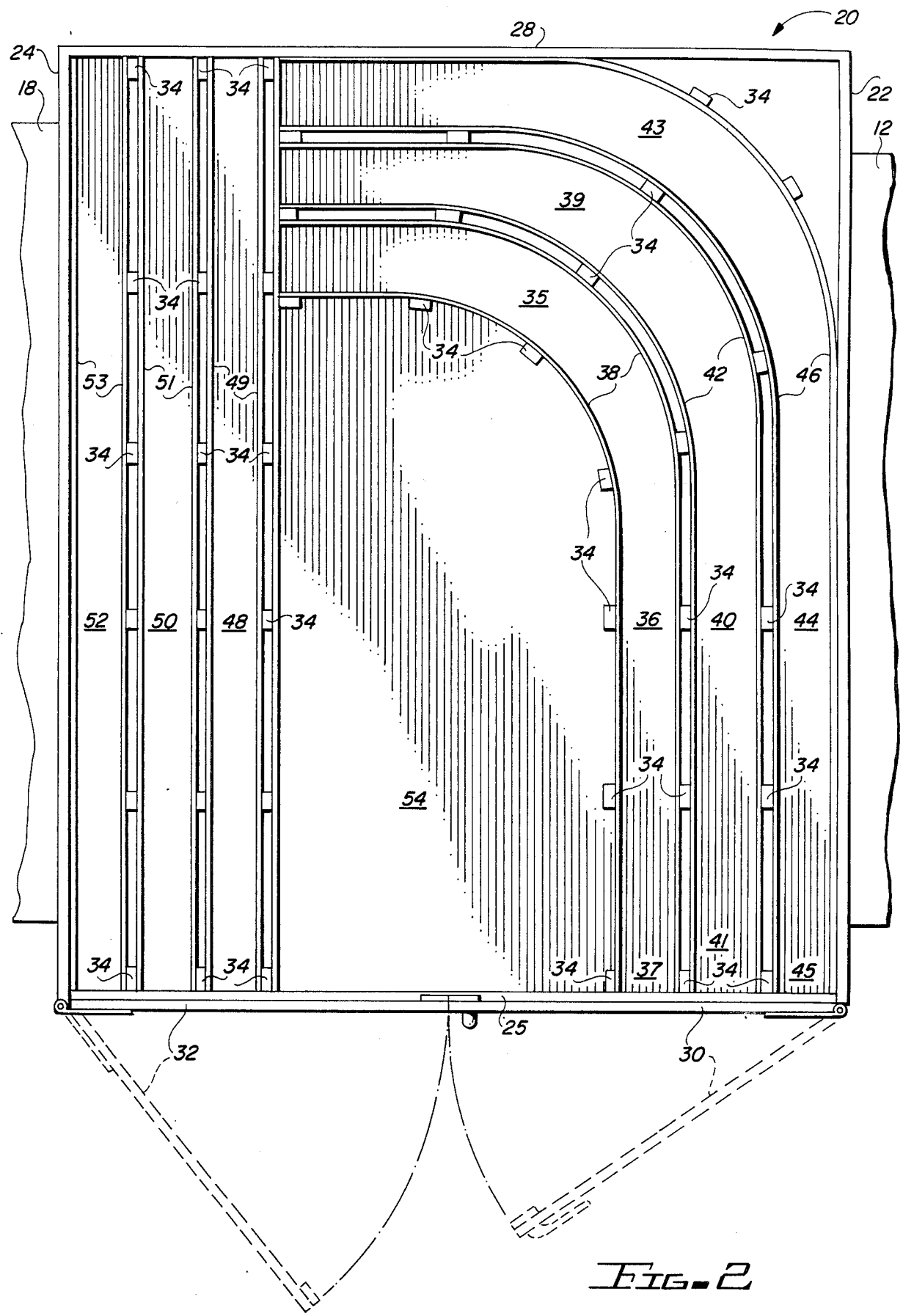
FIG. 2 is a top plan view illustrating the shipping rack portion of the equipment shown in FIG. 1.

A shipping rack 20 in accordance with the present invention is mounted on the support surface of the transport body 18. With reference to FIGS. 1, 2 and 3, the shipping rack 20 is defined by front and back side panels 22, 24, end 28 and top 26 (the top 26 is cut away in FIG. 1 to illustrate the internal layout of the shipping rack 20 in that FIGURE. The shipping rack 20 may be supported by a sub-frame 25 resting on the support surface of the transport body 18. The shipping rack 20 further includes a pair of doors 30, 32 hinged at the end opposite the end panel 28. As thus situated on the transport body 18, the shipping rack 20 extends laterally across the transport body with the shipping rack being generally normal to the direction of travel of the prime mover 12. Typically, the lateral width of the transport body 18 is about 102 inches, and in order to fit within that space, the shipping rack 20 has a corresponding dimension along the side panels 22 and 24. By way of example, the length of the shipping rack along the end panel 28 is typically 84 inches, and the rack may be 68 inches high. However, it will be understood that these dimensions are illustrative only and this invention is not in any way limited to these dimensions.

In accordance with the present invention, a series of compartments 36, 40, 44, 48, 50 and 52 are formed in the shipping rack 20 utilizing a construction of vertical ribs 34 and railings 38, 42, 46, 49, 51 and 53. Preferably, three of the compartments 36, 40 an 44 are curved at a corresponding end 35, 39 and 43, respectively, in order to fit within the lateral dimension of the transport body 18.

With specific reference to FIGS. 2, 3 and 4, each of the curved compartments 36, 40 and 44 include a respective first, uncurved end 37, 41 and 45 and a respective second, curved end 35, 39 and 43. These curved compartments 36, 40 and 44 are defined by the vertical ribs 34 and corresponding horizontal railings. As to curved compartment 36, there are three sets of railing pairs 38 on opposite sides of the compartment 36 which extend from the uncurved end 37 and about the curved end 35 to the second extremity of the compartment 36. Likewise, railing pairs 42 extend from the first, uncurved end 41 of compartment 40 around the curved end 39 of that compartment and to the extremity thereof. Railings 46 in compartment 44 serve a similar function.

As will be appreciated by those skilled in the construction arts, certain categories of construction materials, including the plastic laminates discussed above, must be handled with care to avoid damage. It will be appreciated that the railings discussed above permit those types of construction materials having a length greater than the lateral width of the transport body 18 to be pushed through the compartments 36, 40 and 44 and be carried by the railings into a curved storage position. Typically, sheets of such materials are available in 10- and 12-foot lengths. When a transport body such as that shown as transport body 18 in FIG. 1 has a limiting dimension (for example, the 8.5-foot dimension described above) the provision in the shipping rack 20 of the curved compartments 36, 40 and 44 permits such oversized lengths of construction materials to be shipped and stored in the rack 20. It will be further appreciated that the railings permit the loading of such materials without damage by acting as a camming surface to gently bend the construction materials around the radius of the curved ends 35, 39 and 43.

Uncurved compartments 48, 50 and 52 may also be provided along another side 24 of the shipping rack 20 and may likewise be defined by vertical ribs 34 and horizontal railings 49, 51 and 53.

The configuration of the curved compartments and the uncurved compartments shown in FIG. 2 thus establishes a storage area 54 between the curved and uncurved compartment areas. storage area 54 between the curved and uncurved compartment areas.

I claim:

1. A vehicle including a shipping rack for bendable construction materials, such as laminate sheeting and the like, of the type having a length-wise dimension greater than a dimension of said vehicle, comprising:
   (a) a vehicular prime mover;
   (b) a wheel-supported transport body with said prime mover;
   (c) a shipping rack on said transport body, said shipping rack comprising frame means defining plural compartments across said transport body, each compartment having a dimension longer than a corresponding dimension of said transport body, but each compartment being curved so as to fit within said corresponding dimension; and wherein
   (d) said bendable construction materials having a length-wise dimension greater than said dimension of said transport body may be transported in said shipping rack by bending along said curved compartments.

2. The vehicle including a shipping rack as recited in claim 1 wherein said transport body includes a support surface with said shipping rack supported thereon.

3. The vehicle including a shipping rack as recited in claim 2 wherein said support surface lies in a plane generally parallel with a surface across which said prime mover is to traverse.

4. The vehicle including a shipping rack as recited in claim 3 wherein each of said curved compartments are defined by frame members extending generally normal to said support surface and curved railings extending between said frame members and generally parallel with said support surface.

5. The vehicle including a shipping rack as recited in claim 4 wherein each of said curved compartments includes a firsts, uncurved portion extending laterally across said support surface and generally normal to the direction of travel of said prime mover, and a curved portion extending generally parallel with the direction of travel.

6. The vehicle including a shipping rack as recited in claim 5 further comprising an enclosure about said shipping rack, said enclosure supported by said transport body.

7. The vehicle including a shipping rack as recited in claim 6 wherein said enclosure further comprises a door permitting access to each of said curved compartments at an end of said first, uncurved portions thereof.

8. The vehicle including a shipping rack as recited in claim 7 wherein said shipping rack further comprises uncurved compartments extending generally parallel with a portion of said curved compartments.

9. The vehicle including a shipping rack as recited in claim 8 wherein said enclosure, said frame members, said uncurved compartments and said support surface define a storage area surrounded by said shipping rack.

10. A vehicle shipping rack for transporting bendable construction materials, comprising:
    (a) frame means defining plural, generally parallel compartments, each compartment including a first, uncurved portion extending from one end and a second, curved portion adjacent a second end thereof;
    (b) plural railings attached to said frame means and extending along said compartments continuously from said first end to said second end; and wherein
    (c) the lengthwise dimension of each compartment between the first and second ends is greater than a dimension of a transport vehicle upon which said shipping rack is to be fitted, and in which each said compartment is dimensioned to fit within said dimension of said transport vehicle by virtue of the curving of said second portion of each said compartment in said shipping rack.

11. The shipping rack recited in claim 10 wherein said frame means comprises plural framing ribs extending generally normal to said railings, said railings positioned inwardly in each corresponding compartment from the adjacent ones of said ribs, wherein bendable material may slide along said railings in each compartment and bend about said second, curved portion.

12. The shipping rack recited in claim 11 further comprising uncurved compartments extending generally parallel with said first, uncurved portion of said curved compartments, said uncurved compartments terminating at said second end of said curved compartments.

13. The shipping rack recited in claim 12 further comprising a storage area between said curved and uncurved compartments.

14. A vehicle including a shipping rack for sheets of bendable construction materials having a lengthwise dimension greater than a dimension of said vehicle, comprising:
    (a) a vehicular prime mover;
    (b) a wheel-supported transport body with said prime mover;
    (c) a shipping rack on said transport body, said shipping rack comprising frame means defining plural compartments across said transport body, each compartment having a dimension to receive a bendable construction material of a particular dimension, which dimension is longer than a corresponding dimension of said transport body;
    (d) each compartment of said shipping rack also having a dimension longer than the corresponding dimension of said transport body and adapted to receive a bendable building material of a corresponding length, each compartment being curved so as to fit within the corresponding dimension of said transport body;
    (e) each of said curved compartments including an uncurved portion extending generally laterally across said transport body normal to the direction of travel of said prime mover, and a curved portion extending generally parallel with the direction of travel of said prime mover;
    (f) an enclosure about said shipping rack, said enclosure supported by said transport body; and
    (g) a door permitting access to said compartments at one end thereof.

15. The vehicle including a shipping rack as recited in claim 14 further comprising uncurved compartments extending generally parallel with said uncurved portion of said curved compartments.

16. The vehicle including a shipping rack as recited in claim 15 wherein said enclosure, said frame members, said uncurved channels and said transport body define a storage area at least partially surrounded by said shipping rack.

* * * * *